Dec. 3, 1968    B. CHOJNOWSKI ET AL    3,414,052
TUBULAR HEAT EXCHANGERS
Filed Oct. 18, 1966
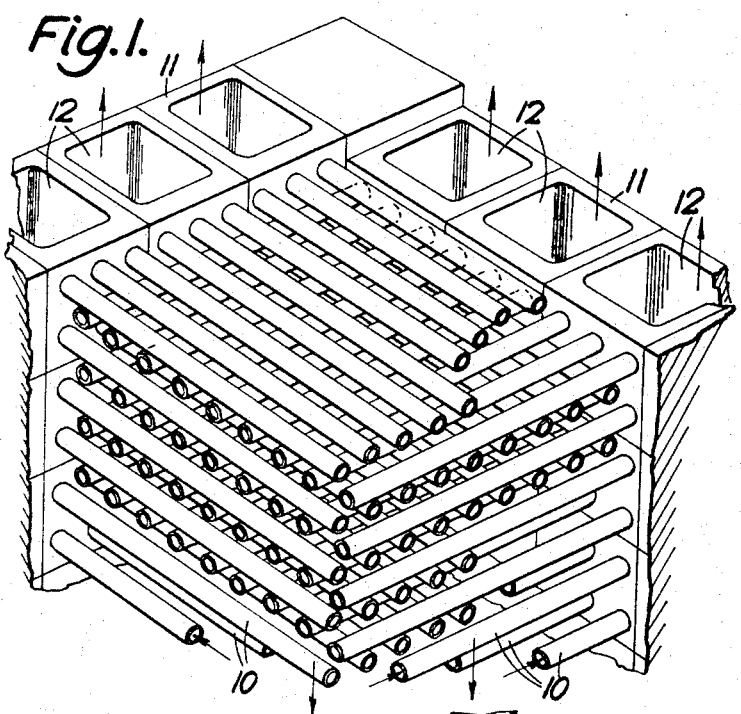
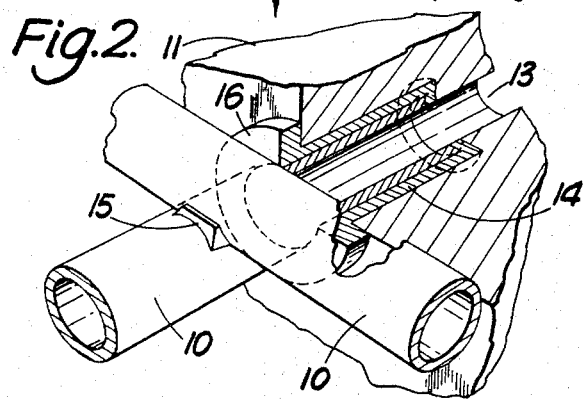

United States Patent Office 3,414,052
Patented Dec. 3, 1968

3,414,052
TUBULAR HEAT EXCHANGERS
Boguslaw Chojnowski, Romsey, and Bruce Anthony Beckerleg, Dibden, England, assignors to Central Electricity Generating Board, London, England, a British body corporate
Filed Oct. 18, 1966, Ser. No. 587,457
Claims priority, application Great Britain, Nov. 9, 1965, 47,536/65
5 Claims. (Cl. 165—164)

ABSTRACT OF THE DISCLOSURE

A recuperative heat exchanger comprises a matrix of tubes, typically ceramic tubes, in horizontal layers, the tubes in each layer being spaced apart and parallel to one another but transverse to tubes in adjacent layers. The tubes are supported in walls having vertical ducts forming headers so that one of the heat exchanger fluids can be passed through the tubes and the other vertically through the matrix around the outside of the tubes. Saddles formed of refractory packing is provided at each point where the tubes cross so that the whole structure may be made rigid.

---

This invention relates to tubular recuperative heat exchangers. Such a heat exchanger may be used, for example, as a recuperator for heating combustion air utilising the heat from combustion gases. The invention may be used for heat exchangers using metal tubes but finds particular application for heat exchangers operating at very high temperatures using ceramic tubes. For example, in a magnetohydrodynamic generator of the open-cycle type burning fossil fuel in order to achieve the required high temperature of the outlet gases in the burner, the combustion air has to be preheated to a very high temperature. For such purposes a ceramic recuperator may have to be used.

The usual practice in making large ceramic recuperative air heaters is to employ a large number of ceramic elements designed to fit together to form a matrix assembly. Such an assembly of elements however is rather bulky and the complete recuperative unit is very large in size. The large number of joints present in the matrix makes the recuperator prone to leakage. These difficulties might be overcome by using long ceramic tubes for construction of the matrix but then further problems arise such as the vibration of the tubes induced by the gas flow and the sagging of the tubes under their own weight in the case of horizontal tube arrangements. Moreover it is difficult to design the tube manifold and the tube joints to cater for moderate pressure differentials between the two heat exchanging fluids and the thermal expansion of the tubes.

According to this invention a recuperative heat exchanger comprises a matrix of tubes arranged in horizontal layers, the tubes of the successive layers resting on or being joined to one another at the cross-over points and with the tubes in each layer parallel to one another but transverse to tubes in adjacent layers. The invention, as indicated above is particularly applicable to ceramic tube heat exchangers and the invention includes within its scope a heat exchanger comprising a matrix of ceramic tubes arranged in horizontal layers, the successive layers resting on one another with the tubes in each layer parallel to one another but transverse to tubes in adjacent layers.

Preferably a compressible refractory packing would be used to form a saddle between the tubes at each point where the tubes cross. The tubes may extend between walls containing vertical ducts forming headers, each tube extending through the wall structure at each end of the tube into a duct whereby a fluid introduced into a duct or ducts in one wall passes through tubes and out through a duct or ducts in another wall, and the tubes being sealed into the walls at their ends. In a ceramic tube heat exchanger for operating at high temperatures, the walls would preferably be made of ceramic material. With this construction, one of the heat exchange fluids would be passed through the main body of the assembly over the tubes and the other fluid would be passed through the tubes and the ducts forming the header which would also form connections between the adjacent cross passes in matrix designs with more than one cross pass. With this arrangement, it is possible to use relatively short tubes and the whole structure may be made very rigid.

The sealing of the tubes into the walls may be effected using a compressible refractory packing.

Most conveniently the tubes in adjacent layers extend at right angles to one another with the walls forming an assembly of square section considered in a horizontal plane.

One embodiment of the invention is illustrated in the accompanying drawings in which:

FIGURE 1 is an isometric view of part of a heat exchanger, some of the tubes and wall being cut away to show the construction; and FIGURE 2 is an isometric view, on a larger scale than FIGURE 1, showing the manner of fixing a tube end and the packing between crossing tubes.

Referring to the figures there is illustrated a construction in which a matrix is formed of horizontal ceramic tubes 10 arranged parallel to one another in horizontal layers, the tubes in alternate layers however being at right angles to one another. These tubes extend into walls 11 formed of hollow ceramic bricks. These bricks each have a passage extending through the brick from top to bottom and they are assembled together so that these passages form vertical header ducts 12 in the walls. As is more clearly shown in FIGURE 2, each tube is sealed into an aperture 13 in the brick which aperture extends through the brick to the header duct 12 so that the tube opens into the header duct 12. Sealing is effected using a compressible refractory packing 14 which is sufficiently compressible to allow for differential thermal expansion of the tubes and walls. The successive layers of tubes rest on one another, saddle shaped inserts 15 also formed of compressible refractory material being provided where the various tubes cross one another. In this particular construction the heat exchanger is used to heat combustion air making use of the heat from combustion gases. The combustion gases are passed downwardly through the matrix of tubes around the outside of the tubes. The air to be heated is fed into the header ducts 12 in two adjacent walls at the bottom of these two walls and is taken out from the header ducts 12 in the other pair of walls at the top thereof, so that the air entering a header duct has to pass upwardly and thence through one of the ceramic tubes 10 and so into the header duct in the opposite wall.

In the arrangement of FIGURE 2, flanges 16 are formed on the ends of the bushes 14 of refractory material which are used to seal the tubes into the walls.

The arrangement thus forms a multi-pass counter flow heat exchanger. It has been found that with this construction of matrix, using tubes arranged in a criss-cross pattern, the tubes are not prone to vibration and the whole structure can be made very rigid. The thermal performance of one embodiment of the invention has been found superior to that of other known matrix arrangements of ceramic recuperators.

Although an embodiment employing ceramic tubes has been more particularly described, it is possible for many purposes to use metal tubes. In that case the tubes can be joined at the cross-over points, thereby giving a very rigid structure and so eliminating the problem of vibration.

We claim:

1. A recuperative heat exchanger comprising a matrix of tubes arranged in horizontal layers with the tubes in each layer spaced apart and parallel to one another but transverse to tubes in adjacent layers, refractory packing forming a saddle between the tubes at each point where the tubes cross and walls containing vertical ducts forming headers, said walls surrounding the matrix with the tubes each extending between a duct in one wall and a duct in the opposite wall and being sealed into the walls.

2. A recuperative heat exchanger as claimed in claim 1 wherein said refractory packing is a compressible packing material.

3. A heat exchanger as claimed in claim 1 and having ceramic tubes, wherein the walls are made of ceramic material.

4. A heat exchanger as claimed in claim 1 wherein the tubes are sealed into the wall with a compressible refractory packing.

5. A heat exchanger as claimed in claim 1 wherein the tubes in adjacent layers extend at right angles to one another with the walls forming an assembly of square section considered in a horizontal plane.

References Cited

UNITED STATES PATENTS

| | | | |
|---|---|---|---|
| 1,571,068 | 1/1926 | Stoncliffe | 165—165 |
| 1,670,127 | 5/1928 | Stoncliffe | 165—165 |
| 2,310,927 | 2/1943 | Bay. | |
| 3,001,766 | 9/1961 | Laist | 165—164 X |

FOREIGN PATENTS

| | | |
|---|---|---|
| 910,711 | 5/1954 | Germany. |

ROBERT A. O'LEARY, *Primary Examiner.*

THEOPHIL W. STREULE, *Assistant Examiner.*